(12) United States Patent
Choi et al.

(10) Patent No.: US 11,966,483 B2
(45) Date of Patent: Apr. 23, 2024

(54) SYSTEMS AND METHODS FOR SECURE RANDOM NUMBER GENERATION

(71) Applicant: Verizon Patent and Licensing Inc., Basking Ridge, NJ (US)

(72) Inventors: Young Rak Choi, Belle Mead, NJ (US); Manuel Enrique Caceres, Basking Ridge, NJ (US); Warren Hojilla Uy, Randolph, NJ (US); Dayong He, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 17/305,136

(22) Filed: Jun. 30, 2021

(65) Prior Publication Data

US 2023/0004661 A1  Jan. 5, 2023

(51) Int. Cl.
| | | |
|---|---|---|
| G06F 21/60 | (2013.01) | |
| G06F 7/58 | (2006.01) | |
| G06N 10/00 | (2022.01) | |
| H04L 9/00 | (2022.01) | |
| H04L 9/08 | (2006.01) | |

(52) U.S. Cl.
CPC ............ G06F 21/606 (2013.01); G06F 7/582 (2013.01); G06N 10/00 (2019.01); *G06F 2221/2149* (2013.01); *H04L 9/002* (2013.01); *H04L 9/0869* (2013.01)

(58) Field of Classification Search
CPC ................... G06F 21/606; G06F 7/582; G06F 2221/2149; G06N 10/00
See application file for complete search history.

(56) References Cited

U.S. PATENT DOCUMENTS

| | | | |
|---|---|---|---|
| 7,571,199 B1 * | 8/2009 | Field | G06F 7/58 708/250 |
| 2015/0058841 A1 * | 2/2015 | Krempa | G06F 9/45558 718/1 |
| 2017/0005990 A1 * | 1/2017 | Birger | H04L 9/0819 |

* cited by examiner

*Primary Examiner* — Matthew T Henning

(57) ABSTRACT

A device may receive, at an operating system, a request for a random number from an application. The device may provide a command to generate an entropy input, based on the request for the random number and through a driver that is isolated from the operating system, to a quantum random number generator that is isolated from one or more processors hosting the operating system. Accordingly, the device may receive the entropy input, from the quantum random number generator, using the driver, and may generate the random number based at least in part on the entropy input. The device may provide the random number to the application.

20 Claims, 12 Drawing Sheets

SYSTEMS AND METHODS FOR SECURE RANDOM NUMBER GENERATION

BACKGROUND

Random numbers are used for many operations in computing. For example, random numbers may be used to generate keys and initialize vectors (e.g., for symmetric or asymmetric encryption), generate unique identifiers (e.g., session IDs or process thread IDs), initialize Monte Carlo simulations, or determine initial states for machine learning models, among other examples. To improve security (e.g., for encryption) and/or accuracy (e.g., for modelling), random numbers with high entropy are preferred to random numbers with low entropy.

DETAILED DESCRIPTION OF PREFERRED EMBODIMENTS

Figure 1A:
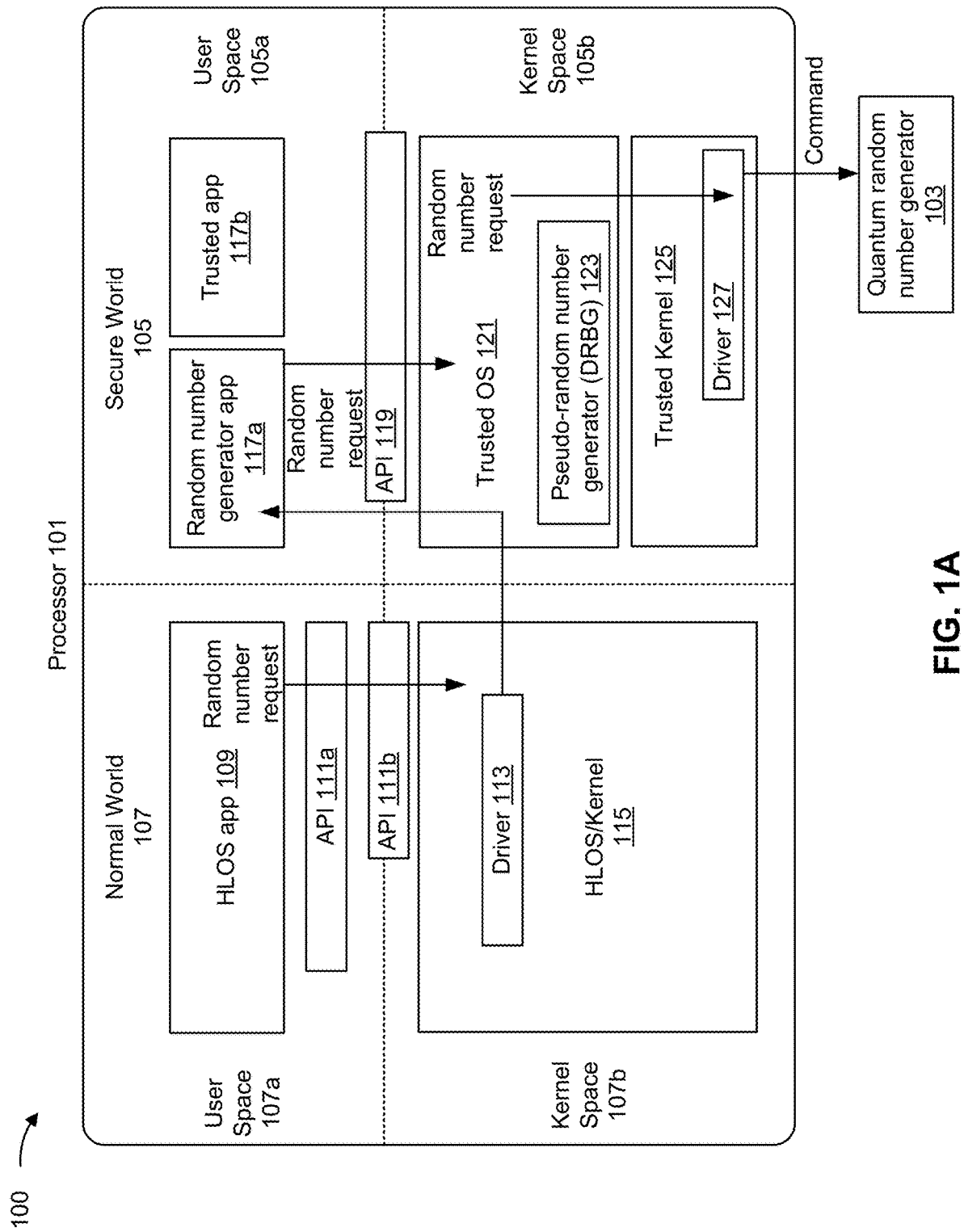
FIGS. 1A-1H are diagrams of examples associated with secure random number generation.

The following detailed description of example implementations refers to the accompanying drawings. The same reference numbers in different drawings may identify the same or similar elements.

Mobile devices often use randomly generated numbers to generate encryption keys and initialization vectors for encryption. However, when the numbers are pseudo-randomly generated by algorithm and thus with low entropy, data that is subsequently encrypted may be subject to attack. For example, if an attacker gains access to a high-level operating system of the mobile device, the attacker may determine which pseudo-random number algorithm was used, predict encryption keys and initialization vectors, and decrypt the data accordingly. To combat these risks, mobile devices may include a quantum random number generator instead, which can be used to generate high entropy random numbers for encryption. However, the quantum random number generator is usually directly interfaced with a host processor of the mobile device. This allows an attacker to intercept an entropy input output by the quantum random number generator by gaining access to the driver that interfaces with the quantum random number generator. Additionally, the entropy input from the quantum random number generator may be used to seed a deterministic random bit generator (DRBG) or other pseudo-random number generator; however, this DRBG is usually executed within an environment of the high-level operating system, which is not secured against attackers. Accordingly, an attacker may intercept the output from the DRBG, which again allows for decryption of the data.

Some implementations described herein provide a secure operating system that interfaces with a quantum random number generator using a secure driver. In some implementations, a pseudo-random number generator may additionally operate within an environment of the secure operating system and use the quantum random number generator to obtain an entropy input. Accordingly, the secure operating system may provide a random number to a high-level operating system without exposing the quantum random number generator to attackers (e.g., via a corresponding driver). Additionally, in some implementations, the pseudo-random number generator may be executed within the environment of the secure operating system to prevent exposure of the pseudo-random number generator to attackers.

As an alternative, in some implementations, a Secure Element may interface with the quantum random number generator using the secure driver. Accordingly, both the high-level operating system and the secure operating system may obtain random numbers without exposing the quantum random number generator to attackers. Additionally, in some implementations, the pseudo-random number generator may be executed within the Secure Element to prevent exposure of the pseudo-random number generator to attackers.

FIGS. 1A-1D are diagrams of an example 100 associated with secure random number generation, and FIGS. 1E-1H are diagrams of an example 150 associated with secure random number generation. As shown in FIGS. 1A-1H, examples 100 and 150 each include a processor 101 and a quantum random number generator 103. In some implementations, processor 101 and/or quantum random number generator 103 may be included in user device 310 of FIG. 3.

In example 100, and as shown in FIG. 1A, the processor 101 may provide an execution environment for a secure operating system that provides a secure world 105 and a high-level operating system (HLOS) that provides a normal world 107. The secure operating system may be implemented within a trusted execution environment (TEE) such that a security monitor (or other lower level of a chipset including the processor 101) uses a private key embedded within the chipset in order to securely bootload the secure operating system. For example, the processor 101 may support a Platform Security Processor (PSP) developed by Advanced Micro Devices® (AMD®), TrustZone developed by ARM®, Trusted Execution Technology developed by Intel®, or another hardware technology that allows implementations of a TEE for the secure operating system. Additionally, the secure operating system may only allow applications that are signed by the private key such that applications with corresponding hash codes that are not approved by the secure operating system are not executed within the secure world 105. Accordingly, the secure world 105 is protected from attackers. On the other hand, the HLOS may include a Windows®-based OS, an Android® OS, a Unix-based OS, iOS, or another operating system implemented within a standard execution environment that allows a user to install and execute more applications (e.g., in the normal world 107) than would be allowed in a TEE.

As further shown in FIG. 1A, the secure world 105 may be divided (e.g., logically and/or virtually) between a user space 105a and a kernel space 105b. The kernel space 105b may implement drivers and other lower-level software that interacts with the chipset and other hardware connected to the chipset (e.g., via buses). The user space 105a may provide an environment for applications and other higher-level software. Similarly, the normal world 107 may be divided between a user space 107a and a kernel space 107b. The kernel space 107b may implement drivers and other lower-level software that interacts with the chipset and other hardware connected to the chipset (e.g., via buses), and the user space 107a may provide an environment for applications and interaction with the user.

In example 100, applications executed on the processor 101 may request a random number (e.g., for encryption, ID generation, or model initiation). As shown in FIG. 1A, a request for a random number may be initiated by an application 109 executed within the user space 107a of the normal world 107. For example, the application 109 may call an application programming interface (API) 111a provided by the HLOS that allows an application to request a random number. The API 111a may pass the request to, or otherwise call, an API 111b that is associated with the secure operating system. For example, the API 111a may be programmed to call the API 111b when the chipset includes the quantum random number generator 103 in order to obtain a random number using the quantum random number generator 103. By not provisioning the API 111b directly to applications executed within the user space 107a of the normal world 107, the HLOS protects the API 111b against denial-of-service (DoS) attacks from malicious software in the user space 107a, which would prevent applications from obtaining random numbers when needed. Additionally, the HLOS does not expose the existence of the quantum random number generator 103 to applications executed within the user space 107a of the normal world 107, which prevents malicious software in the user space 107a from intelligently searching for and attempting to control the quantum random number generator 103.

As further shown in FIG. 1A, the API 111b may pass the request to a kernel 115 of the HLOS. For example, the API 111b may be associated with a driver 113 that was provisioned by the secure operating system to allow access to the user space 105a of the secure world 105 via the kernel 115 of the HLOS. In some implementations, as shown in FIG. 1A, the normal world 107 and the secure world 105 may be logically and/or virtually isolated on a same processor 101 such that the driver 113 is a virtual driver. Using the same processor 101 reduces latency in communications between the normal world 107 and the secure world 105, which speeds up how quickly applications (such as application 109) can obtain random numbers. Using the same processor 101 also reduces a size associated with the chipset. As an alternative, the normal world 107 and the secure world 105 may be physically isolated on different processors such that the driver 113 is a hardware driver. Using different processors renders the secure world 105 even less susceptible to attacks because any malicious software in the user space 107a or the kernel space 107b cannot physically access the secure world 105.

As further shown in FIG. 1A, the driver 113 may pass the request to an application 117a associated with processing requests for random numbers. The application 117a may be implemented in the user space 105a such that the driver 113 does not have access to the kernel space 105b of the secure world 105. Accordingly, the secure world 105 is rendered less susceptible to attacks because any malicious software in the kernel space 107b of the normal world 107 cannot call or otherwise access functions in the kernel space 105b of the secure world 105. As an alternative, in some implementations, the driver 113 may pass the request directly to the trusted operating system 121, as described below. Allowing the driver 113 to pass the request directly to the trusted operating system 121 reduces latency in communications between the kernel 115 of the HLOS and the trusted operating system 121, which speeds up how quickly applications (such as application 109) can obtain random numbers.

The application 117a may call an API 119 that allows a trusted application to request a random number. As further shown in FIG. 1A, the API 119 may pass the request to the trusted operating system 121, which further passes the request to a trusted kernel 125 of the secure operating system. In some implementations, as shown in FIG. 1A, the trusted operating system 121 (e.g., including core functions and libraries that support the user space 105a) may be logically distinct from the trusted kernel 125 (e.g., including drivers and other software that interacts directly with the chipset and hardware connected to the chipset). Separating the trusted operating system 121 from the trusted kernel 125 further secures the hardware because, even if malicious software were to obtain control of the trusted operating system 121, the malicious software cannot exercise control over the trusted kernel 125. As an alternative, in some implementations, the trusted operating system 121 may be logically integrated with the trusted kernel 125 (e.g., similar to the integration of core functions and libraries for the HLOS with the kernel 115). Integrating the trusted operating system 121 and the trusted kernel 125 reduces latency in communications between the trusted operating system 121 and the trusted kernel 125, which speeds up how quickly applications (such as application 109) can obtain random numbers.

The API 119 may be associated with a driver 127 executed by the trusted kernel 125 to access the quantum random number generator 103 (which may be connected to the chipset including processor 101 via one or more buses). In some implementations, as shown in FIG. 1A, the API 119 may pass the request to the driver 127 via the trusted operating system 121 (e.g., using a function call provided by a library of the trusted operating system 121). Passing the request through the trusted operating system 121 reduces latency in communications between the application 117a and the driver 127, which speeds up how quickly applications (such as application 109) can obtain random numbers. As an alternative, in some implementations, the API may pass the request to the driver 127 via the pseudo-random number generator 123. Accordingly, the driver 127 may only be accessed via the pseudo-random number generator 123, which further increases security because, even if malicious software were to obtain control of the trusted operating system 121, the malicious software cannot access the driver 127.

The driver 127 may generate a hardware-level command based on the request and transmit the command (e.g., via a bus) to the quantum random number generator 103. By isolating the quantum random number generator 103 from the chipset including the processor 101, security is increased because malicious software on the chipset cannot directly access the quantum random number generator 103. Additionally, by provisioning the driver 127 within the secure world 105, security is increased because malicious software executing in the normal world 107 cannot directly obtain output from the quantum random number generator 103.

Figure 1B:
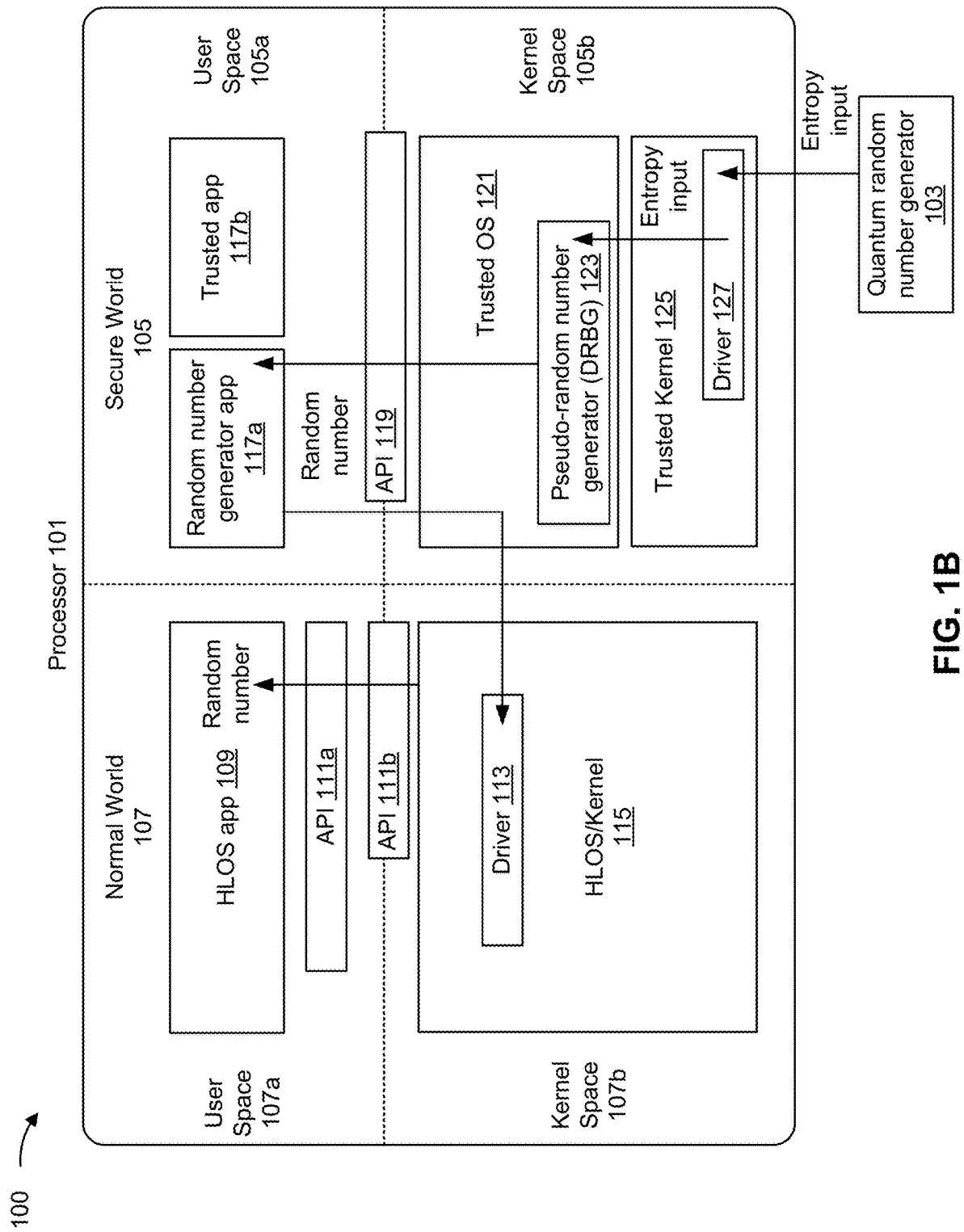

In response to the command from the driver 127, and as shown in FIG. 1B, the quantum random number generator 103 may generate an entropy input (e.g., as described in connection with FIG. 2) and return the entropy input (e.g., via a bus) to the driver 127. Accordingly, the trusted kernel 125 may pass the entropy input to the pseudo-random number generator 123 from the driver 127. As shown in FIG. 1B, the pseudo-random number generator 123 may use the entropy input in a DRBG algorithm such that the random number output by the DRBG algorithm has a length standardized to a use for which the application 109 requested the random number. For example, encryption keys may depend on random numbers of a preconfigured length, and model initiation may depend on a preconfigured quantity of weights or initial values, among other examples. By implementing the pseudo-random number generator 123 within the kernel space 105b of the secure world 105, security is increased because malicious software executing in the normal world 107 and/or the user space 105a of the secure world 105 cannot access or control the pseudo-random number generator 123. Accordingly, an attacker may be unable to determine an algorithm used by the pseudo-random number generator 123, which would enable the attacker to predict an encryption key (or other variable) based on the random number if the attacker were able to obtain the entropy input. As an alternative, in some implementations, the entropy input may be used as the random number without applying the pseudo-random number generator 123. Using the entropy input directly conserves processing resources and power at the processor 101.

In some implementations, and as shown in FIG. 1B, the trusted kernel 125 may pass the entropy input directly to the pseudo-random number generator 123. Accordingly, security is increased because, even if malicious software were to obtain control of the trusted operating system 121, the malicious software cannot access the entropy input. As an alternative, in some implementations, the trusted kernel 125 may pass the entropy input to the pseudo-random number generator 123 by calling a function of a library within the trusted operating system 121 and/or by otherwise using the trusted operating system 121. Using the trusted operating system 121 can reduce code complexity and conserve processing resources because the same function called by the API 119 can be used to return the output from the pseudo-random number generator 123 to the API 119.

After the output of the pseudo-random number generator 123, which corresponds to the random number that fulfills the request from the application 109, is passed back to the application 117a (e.g., via the API 119), the application 117a forwards the random number to the kernel 115 of the HLOS via the driver 113. Accordingly, the random number is returned to the application 109 (e.g., via the API 111a and/or the API 111b). The application 109 may therefore proceed with encryption, model initiation, or another use of the random number without exposing the quantum random number generator 103 and/or the pseudo-random number generator 123 to the normal world 107. This prevents malicious software in the normal world 107 from obtaining the entropy input and/or the algorithm used by the pseudo-random number generator 123, which would allow the malicious software to predict encryption keys, initialization vectors, or other variables based on the random number. Accordingly, files encrypted using the random number, and models trained based on the random number, among other examples, are secured from interference and/or theft by malicious actors.

Figure 1C:
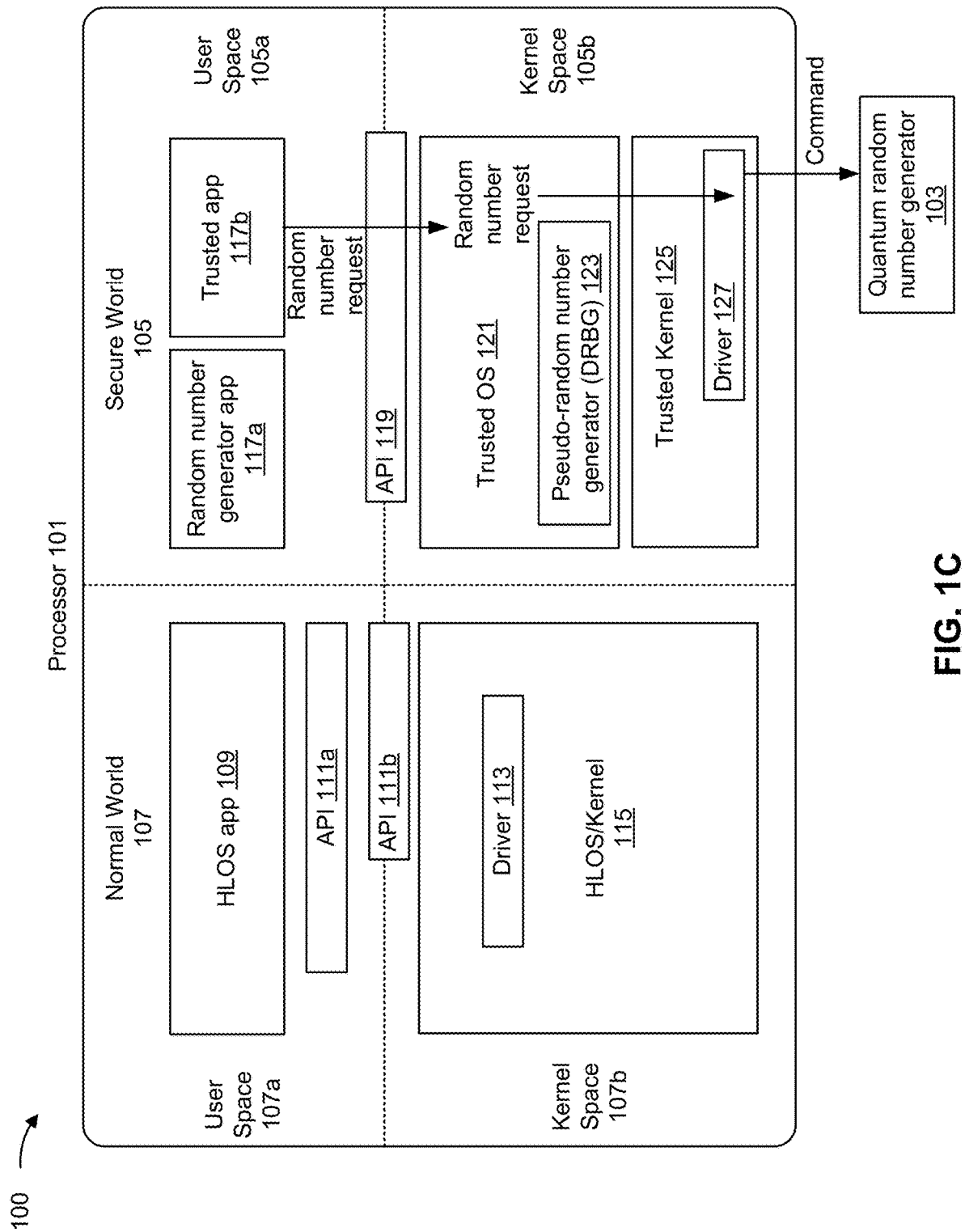

Applications executed within an environment of the secure world 105 may similarly request random numbers. For example, as shown in FIG. 1C, a request for a random number may be initiated by an application 117b executed within the user space 105a of the secure world 105. For example, the application 117b may call the API 119 provided by the secure operating system that allows an application to request a random number. Allowing trusted applications to call the API 119 speeds up how quickly the trusted applications (such as application 117b) can obtain random numbers. As an alternative, in some implementations, the secure operating system may provision the API 119 only for the application 117a, such that the application 117b provides the request to the application 117a, and the application 117a calls the API 119. Limiting access to the API 119 increases security because, on a rare chance that malicious software executes within the user space 105a, the malicious software cannot perform a DoS attack on, or otherwise access, the API 119.

As further shown in FIG. 1C, the API 119 may pass the request to the trusted operating system 121, which further passes the request to a trusted kernel 125 of the secure operating system. In some implementations, as shown in FIG. 1C, the trusted operating system 121 (e.g., including core functions and libraries that support the user space 105a) may be logically distinct from the trusted kernel 125 (e.g., including drivers and other software that interacts directly with the chipset and hardware connected to the chipset). Separating the trusted operating system 121 from the trusted kernel 125 further secures the hardware because, even if malicious software were to obtain control of the trusted operating system 121, the malicious software cannot exercise control over the trusted kernel 125. As an alternative, in some implementations, the trusted operating system 121 may be logically integrated with the trusted kernel 125 (e.g., similar to the integration of core functions and libraries for the HLOS with the kernel 115). Integrating the trusted operating system 121 and the trusted kernel 125 reduces latency in communications between the trusted operating system 121 and the trusted kernel 125, which speeds up how quickly applications (such as application 117b) can obtain random numbers.

The API 119 may be associated with a driver 127 executed by the trusted kernel 125 to access the quantum random number generator 103 (which may be connected to the chipset including processor 101 via one or more buses). In some implementations, as shown in FIG. 1C, the API 119 may pass the request to the driver 127 via the trusted operating system 121 (e.g., using a function call provided by a library of the trusted operating system 121). Passing the request through the trusted operating system 121 reduces latency in communications between the application 117b and the driver 127, which speeds up how quickly applications (such as application 117b) can obtain random numbers. As an alternative, in some implementations, the API may pass the request to the driver 127 via the pseudo-random number generator 123. Accordingly, the driver 127 may only be accessed via the pseudo-random number generator 123, which further increases security because, even if malicious software were to obtain control of the trusted operating system 121, the malicious software cannot access the driver 127.

The driver 127 may generate a hardware-level command based on the request and transmit the command (e.g., via a bus) to the quantum random number generator 103. By isolating the quantum random number generator 103 from the chipset including the processor 101, security is increased because malicious software on the chipset cannot directly access the quantum random number generator 103. Additionally, by provisioning the driver 127 within the secure world 105, security is increased because, on a rare chance that malicious software executes within the user space 105a, the malicious software cannot directly obtain output from the quantum random number generator 103.

Figure 1D:
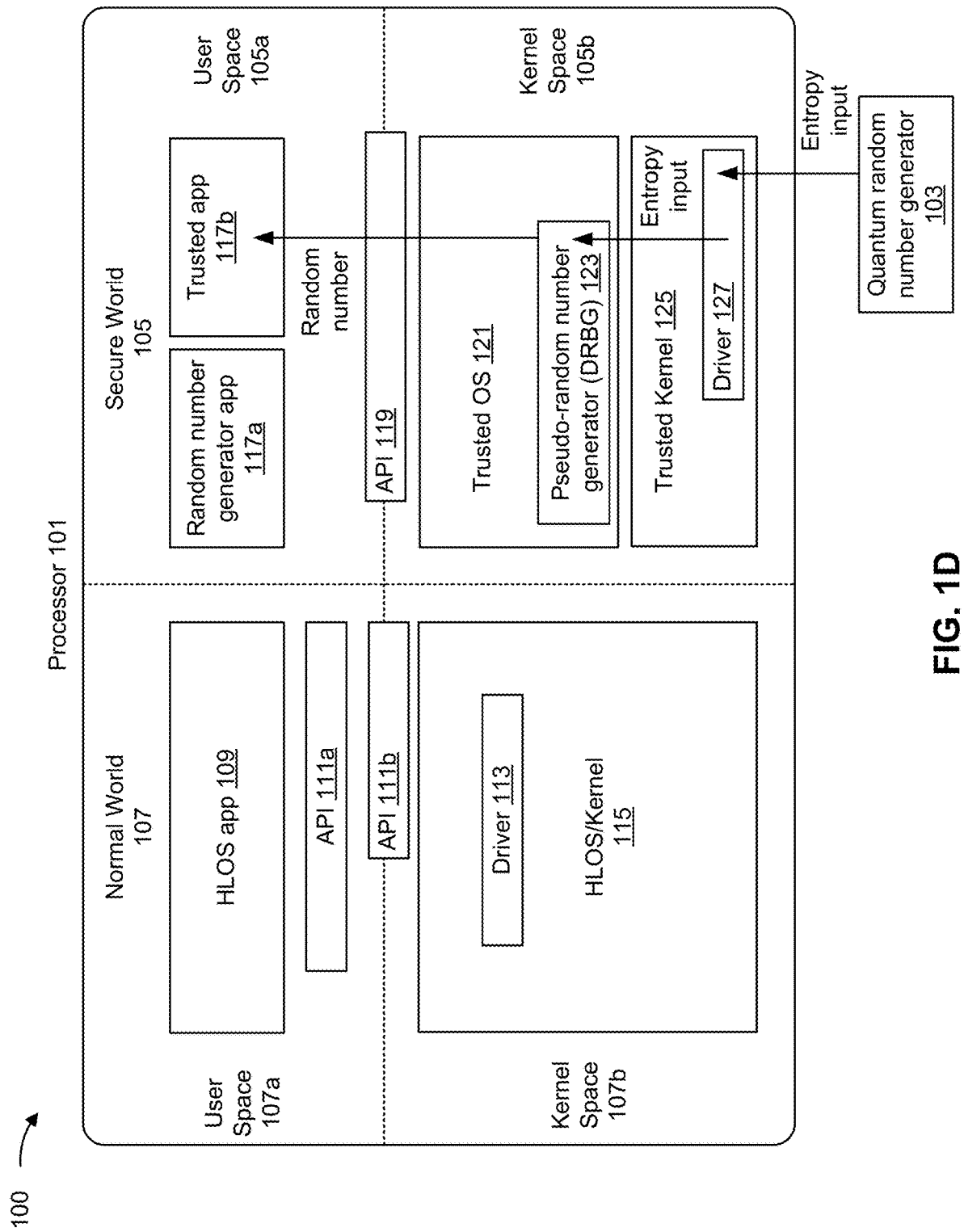

In response to the command from the driver 127, and as shown in FIG. 1D, the quantum random number generator 103 may generate an entropy input (e.g., as described in connection with FIG. 2) and return the entropy input (e.g., via a bus) to the driver 127. Accordingly, the trusted kernel 125 may pass the entropy input to the pseudo-random number generator 123 from the driver 127. The pseudo-random number generator 123 may use the entropy input in a DRBG algorithm such that the random number output by the DRBG algorithm has a length standardized to a use for which the application 117b requested the random number. For example, encryption keys may depend on random numbers of a preconfigured length, and model initiation may depend on a preconfigured quantity of weights or initial values, among other examples. By implementing the pseudo-random number generator 123 within the kernel space 105b of the secure world 105, security is increased because malicious software executing in the user space 105a of the secure world 105 cannot access or control the pseudo-random number generator 123. Accordingly, an attacker may be unable to determine an algorithm used by the pseudo-random number generator 123, which would enable the attacker to predict an encryption key (or other variable) based on the random number if the attacker were able to obtain the entropy input. As an alternative, in some implementations, the entropy input may be used as the random number without applying the pseudo-random number generator 123. Using the entropy input directly conserves processing resources and power at the processor 101.

In some implementations, and as shown in FIG. 1D, the trusted kernel 125 may pass the entropy input directly to the pseudo-random number generator 123. Accordingly, security is increased because, even if malicious software were to obtain control of the trusted operating system 121, the malicious software cannot access the entropy input. As an alternative, in some implementations, the trusted kernel 125 may pass the entropy input to the pseudo-random number generator 123 by calling a function of a library within the trusted operating system 121 and/or by otherwise using the trusted operating system 121. Using the trusted operating system 121 can reduce code complexity and conserve processing resources because the same function called by the API 119 can be used to return the output from the pseudo-random number generator 123 to the API 119.

After the output of the pseudo-random number generator 123, which corresponds to the random number that fulfills the request from the application 117b, is passed back to the application 117b (e.g., via the API 119 and/or the application 117a), the application 117b may proceed with encryption or another use of the random number without exposing the quantum random number generator 103 and/or the pseudo-random number generator 123 to the user space 105a of the secure world 105. This prevents malicious software in the user space 105a from obtaining the entropy input and/or the algorithm used by the pseudo-random number generator 123, which would allow the malicious software to predict encryption keys or other variables based on the random number. For example, the application 117b may implement a digital rights management (DRM) model for the chipset, such that the media (or other content) protected by the DRM model is secured from interference and/or theft by malicious actors.

Example 100 as shown in FIGS. 1A-1D does not use additional chip space other than for the processor 101, the quantum random number generator, and any buses therebetween. As an alternative, example 150 as shown in FIGS. 1E-1H uses additional chip space for a Secure Element 151 in order to further increase security. The Secure Element 151 may include a tamper-resistant chip that includes a microprocessor that is hard-coded or otherwise programmed with one or more applications that cannot be altered. By further physically isolating the quantum random number generator 103 from the processor 101, the already-small chance of an attacker gaining control of the quantum random number generator 103 is further reduced.

Figure 1E:
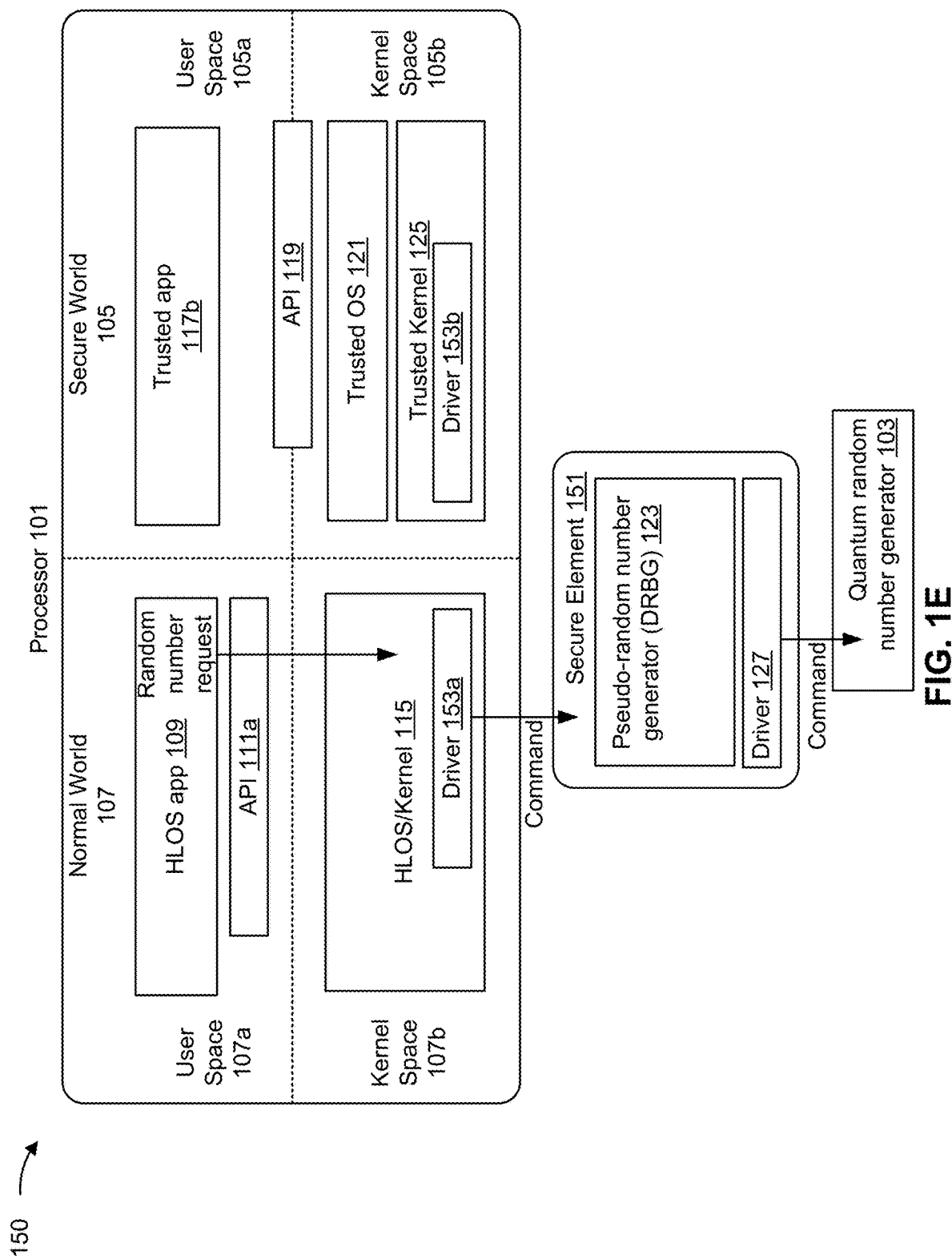

In example 150, applications executed on the processor 101 may request a random number (e.g., for encryption, ID generation, or model initiation). As shown in FIG. 1E, a request for a random number may be initiated by an application 109 executed within the user space 107a of the normal world 107. For example, the application 109 may call the API 111a provided by the HLOS that allows an application to request a random number.

As further shown in FIG. 1E, the API 111a may pass the request to the kernel 115 of the HLOS. For example, the API 111a may be associated with a driver 153a that allows access to one or more applications of the Secure Element 151 via the kernel 115 of the HLOS.

As further shown in FIG. 1E, the driver 153a may generate a hardware-level command based on the request and transmit the command (e.g., via a bus) to the Secure Element 151. By isolating the Secure Element 151 from the chipset including the processor 101, security is increased because malicious software on the chipset cannot directly access the Secure Element 151, much less the quantum random number generator 103.

In some implementations, as shown in FIG. 1E, the Secure Element 151 may pass the command to the driver 127 associated with the quantum random number generator 103. For example, the Secure Element 151 may use a function call provided by a library of an operating environment implemented on the Secure Element 151. Passing the request through the operating environment reduces latency in communications between the Secure Element 151 and the driver 127, which speeds up how quickly applications (such as application 109) can obtain random numbers. As an alternative, in some implementations, the Secure Element 151 may pass the command to the driver 127 via the pseudo-random number generator 123. Accordingly, the driver 127 may only be accessed via the pseudo-random number generator 123, which further increases security because, even if malicious software were to obtain control of the operating environment of the Secure Element 151, the malicious software cannot access the driver 127.

As further shown in FIG. 1E, the driver 127 may generate a hardware-level command based on the request and transmit the command (e.g., via a bus) to the quantum random number generator 103. By isolating the quantum random number generator 103 from the chipset including the processor 101, security is increased because malicious software on the chipset cannot directly access the quantum random number generator 103. Additionally, by provisioning the driver 127 within the Secure Element 151, security is increased because malicious software on the chipset cannot directly obtain output from the quantum random number generator 103.

Figure 1F:
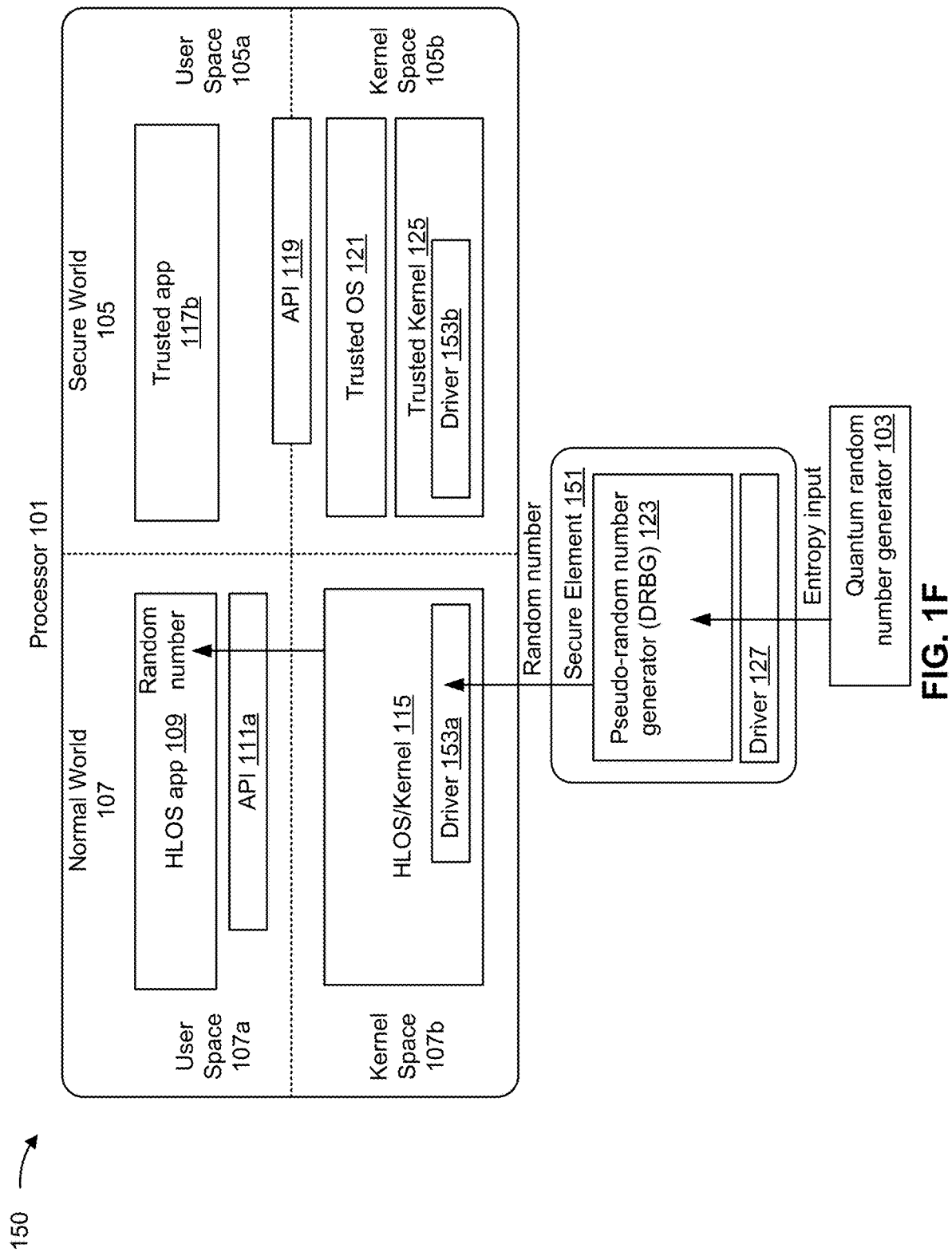

In response to the command from the driver 127, and as shown in FIG. 1F, the quantum random number generator 103 may generate an entropy input (e.g., as described in connection with FIG. 2) and return the entropy input (e.g., via a bus) to the driver 127. Accordingly, the Secure Element 151 may pass the entropy input to the pseudo-random number generator 123 from the driver 127. The pseudo-random number generator 123 may use the entropy input in a DRBG algorithm such that the random number output by the DRBG algorithm has a length standardized to a use for which the application 109 requested the random number. For example, encryption keys may depend on random numbers of a preconfigured length, and model initiation may depend on a preconfigured quantity of weights or initial values, among other examples. By implementing the pseudo-random number generator 123 within the Secure Element 151, security is increased because malicious software executing on the chipset cannot access or control the pseudo-random number generator 123. Accordingly, an attacker may be unable to determine an algorithm used by the pseudo-random number generator 123, which would enable the attacker to predict an encryption key (or other variable) based on the random number if the attacker were able to obtain the entropy input. As an alternative, in some implementations, the entropy input may be used as the random number without applying the pseudo-random number generator 123. Using the entropy input directly conserves processing resources and power at the Secure Element 151.

In some implementations, and as shown in FIG. 1F, the driver 127 may pass the entropy input directly to the pseudo-random number generator 123. Accordingly, security is increased because, even if malicious software were to obtain control of the operating environment of the Secure Element 151, the malicious software cannot access the entropy input. As an alternative, in some implementations, the driver 127 may pass the entropy input to the pseudo-random number generator 123 by calling a function of a library within the operating environment of the Secure Element 151. Using the operating environment of the Secure Element 151 can reduce code complexity and conserve processing resources because the same function triggered by the command from the driver 153*a* can be used to return the output from the pseudo-random number generator 123 to the driver 153*a*.

After the output of the pseudo-random number generator 123, which corresponds to the random number that fulfills the request from the application 109, is passed back to the driver 153*a* (e.g., via a bus), the driver 153*a* forwards the random number to the kernel 115 of the HLOS. Accordingly, the random number is returned to the application 109 (e.g., via the API 111*a*). The application 109 may therefore proceed with encryption, model initiation, or another use of the random number without exposing the quantum random number generator 103 and/or the pseudo-random number generator 123 to the chipset including the processor 101. This prevents malicious software on the chipset from obtaining the entropy input and/or the algorithm used by the pseudo-random number generator 123, which would allow the malicious software to predict encryption keys, initialization vectors, or other variables based on the random number. Accordingly, files encrypted using the random number, and models trained based on the random number, among other examples, are secured from interference and/or theft by malicious actors.

Figure 1G:
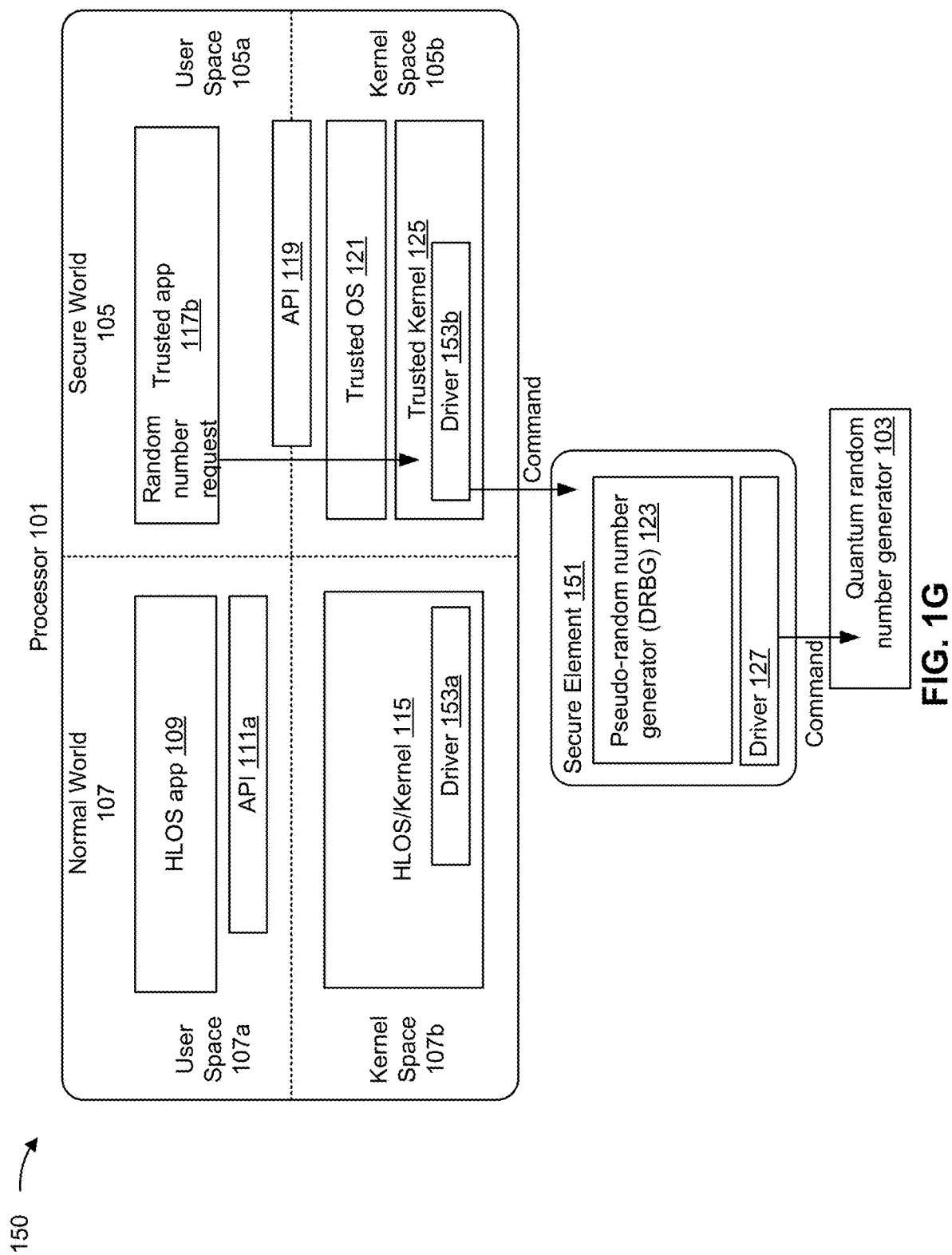

Applications executed within the secure world 105 may similarly request random numbers. As shown in FIG. 1G, a request for a random number may be initiated by an application 117*b* executed within the user space 105*a* of the secure world 105. For example, the application 117*b* may call the API 119 provided by the secure operating system that allows an application to request a random number. Allowing trusted applications to call the API 119 speeds up how quickly the trusted applications (such as application 117*b*) can obtain random numbers. As an alternative, in some implementations, the secure operating system may provision the API 119 only for an application 117*a* (e.g., as described above in connection with example 100) such that the application 117*b* provides the request to the application 117*a*, and the application 117*a* calls the API 119. Limiting access to the API 119 increases security because, on a rare chance that malicious software executes within the user space 105*a*, the malicious software cannot perform a DoS attack on, or otherwise access, the API 119.

As further shown in FIG. 1G, the API 119 may pass the request to the trusted operating system 121, which further passes the request to a trusted kernel 125 of the secure operating system. In some implementations, as shown in FIG. 1G, the trusted operating system 121 (e.g., including core functions and libraries that support the user space 105*a*) may be logically distinct from the trusted kernel 125 (e.g., including drivers and other software that interacts directly with the chipset and hardware connected to the chipset). Separating the trusted operating system 121 from the trusted kernel 125 further secures the hardware because, even if malicious software were to obtain control of the trusted operating system 121, the malicious software cannot exercise control over the trusted kernel 125. As an alternative, in some implementations, the trusted operating system 121 may be logically integrated with the trusted kernel 125 (e.g., similar to the integration of core functions and libraries for the HLOS with the kernel 115). Integrating the trusted operating system 121 and the trusted kernel 125 reduces latency in communications between the trusted operating system 121 and the trusted kernel 125, which speeds up how quickly applications (such as application 117*b*) can obtain random numbers.

The API 119 may be associated with a driver 153*b* executed by the trusted kernel 125 to access one or more applications of the Secure Element 151 (which may be connected to the chipset including processor 101 via one or more buses). As further shown in FIG. 1G, the driver 153*a* may generate a hardware-level command based on the request and transmit the command (e.g., via a bus) to the Secure Element 151. By isolating the Secure Element 151 from the chipset including the processor 101, security is increased because malicious software on the chipset cannot directly access the Secure Element 151, much less the quantum random number generator 103.

In some implementations, as shown in FIG. 1G, the Secure Element 151 may pass the command to the driver 127 associated with the quantum random number generator 103. For example, the Secure Element 151 may use a function call provided by a library of an operating environment implemented on the Secure Element 151. Passing the request through the operating environment reduces latency in communications between the Secure Element 151 and the driver 127, which speeds up how quickly applications (such as application 117*b*) can obtain random numbers. As an alternative, in some implementations, the Secure Element 151 may pass the command to the driver 127 via the pseudo-random number generator 123. Accordingly, the driver 127 may only be accessed via the pseudo-random number generator 123, which further increases security because, even if malicious software were to obtain control of the operating environment of the Secure Element 151, the malicious software cannot access the driver 127.

As further shown in FIG. 1G, the driver 127 may generate a hardware-level command based on the request and transmit the command (e.g., via a bus) to the quantum random number generator 103. By isolating the quantum random number generator 103 from the chipset including the processor 101, security is increased because malicious software on the chipset cannot directly access the quantum random number generator 103. Additionally, by provisioning the driver 127 within the Secure Element 151, security is increased because malicious software on the chipset cannot directly obtain output from the quantum random number generator 103.

Figure 1H:
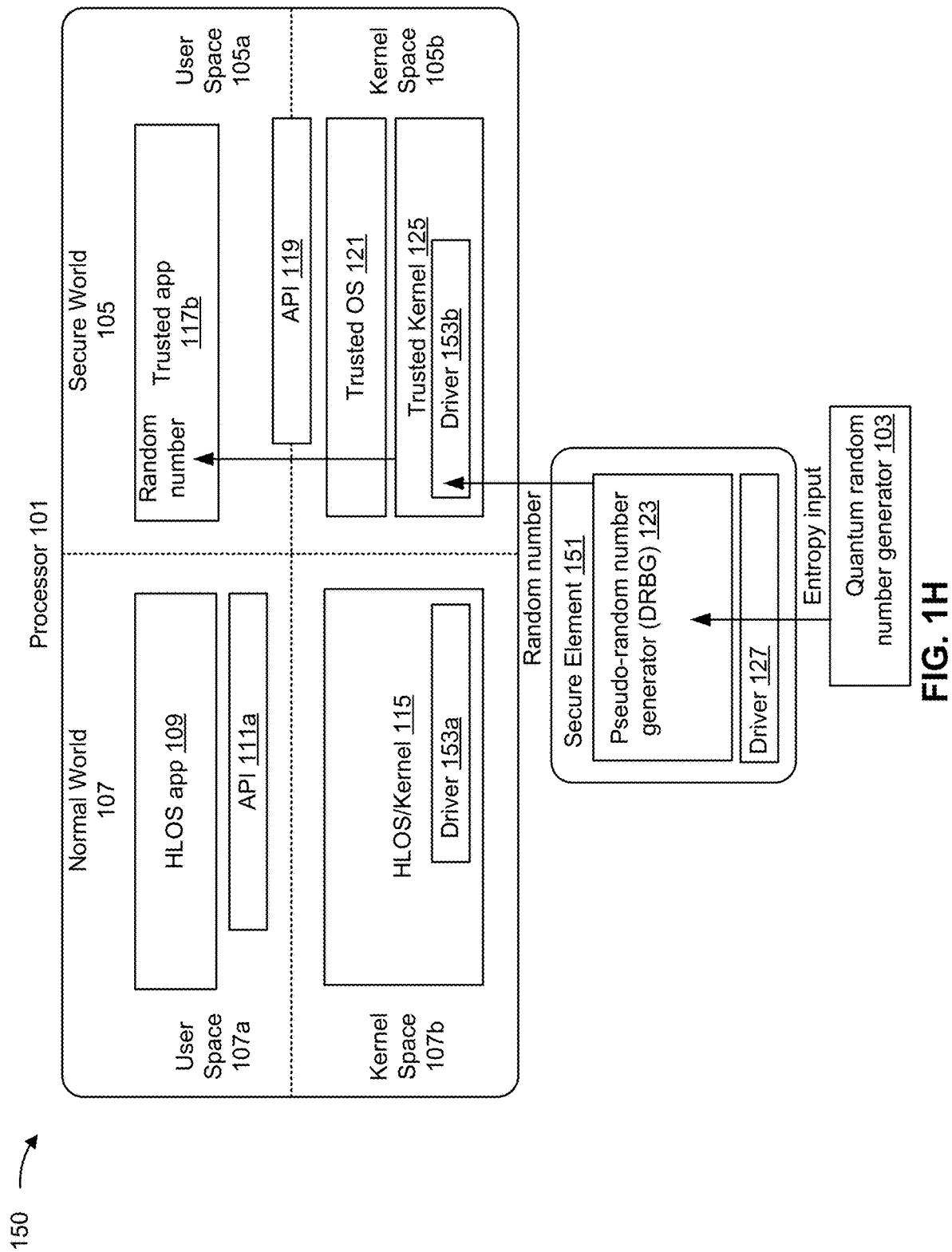

In response to the command from the driver 127, and as shown in FIG. 1H, the quantum random number generator 103 may generate an entropy input (e.g., as described in connection with FIG. 2) and return the entropy input (e.g., via a bus) to the driver 127. Accordingly, the Secure Element 151 may pass the entropy input to the pseudo-random number generator 123 from the driver 127. The pseudo-random number generator 123 may use the entropy input in a DRBG algorithm such that the random number output by the DRBG algorithm has a length standardized to a use for which the application 109 requested the random number. For example, encryption keys may depend on random numbers of a preconfigured length, and model initiation may depend on a preconfigured quantity of weights or initial values, among other examples. By implementing the pseudo-random number generator 123 within the Secure Element 151, security is increased because malicious software executing on the chipset cannot access or control the pseudo-random number generator 123. Accordingly, an attacker may be unable to determine an algorithm used by the pseudo-random number generator 123, which would enable the attacker to predict an encryption key (or other variable) based on the random number if the attacker were able to obtain the entropy input. As an alternative, in some implementations, the entropy input may be used as the random number without applying the pseudo-random number generator 123. Using the entropy input directly conserves processing resources and power at the Secure Element 151.

In some implementations, and as shown in FIG. 1H, the driver 127 may pass the entropy input directly to the pseudo-random number generator 123. Accordingly, security is increased because, even if malicious software were to obtain control of the operating environment of the Secure Element 151, the malicious software cannot access the entropy input. As an alternative, in some implementations, the driver 127 may pass the entropy input to the pseudo-random number generator 123 by calling a function of a library within the operating environment of the Secure Element 151. Using the operating environment of the Secure Element 151 can reduce code complexity and conserve processing resources because the same function triggered by the command from the driver 153b can be used to return the output from the pseudo-random number generator 123 to the driver 153b.

After the output of the pseudo-random number generator 123, which corresponds to the random number that fulfills the request from the application 117b, is passed back to the driver 153b (e.g., via a bus), the driver 153b forwards the random number to the kernel 115 of the HLOS. Accordingly, the random number is returned to the application 117b (e.g., via the API 119 and/or the application 117a). The application 117b may therefore proceed with encryption or another use of the random number without exposing the quantum random number generator 103 and/or the pseudo-random number generator 123 to the chipset including the processor 101. This prevents malicious software on the chipset from obtaining the entropy input and/or the algorithm used by the pseudo-random number generator 123, which would allow the malicious software to predict encryption keys, initialization vectors, or other variables based on the random number. For example, the application 117b may implement a DRM model for the chipset, such that the media (or other content) protected by the DRM model is secured from interference and/or theft by malicious actors.

As indicated above, FIGS. 1A-1H are provided as one or more examples. Other examples may differ from what is described with regard to FIGS. 1A-1H. The number and arrangement of devices shown in FIGS. 1A-1H are provided as one or more examples. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
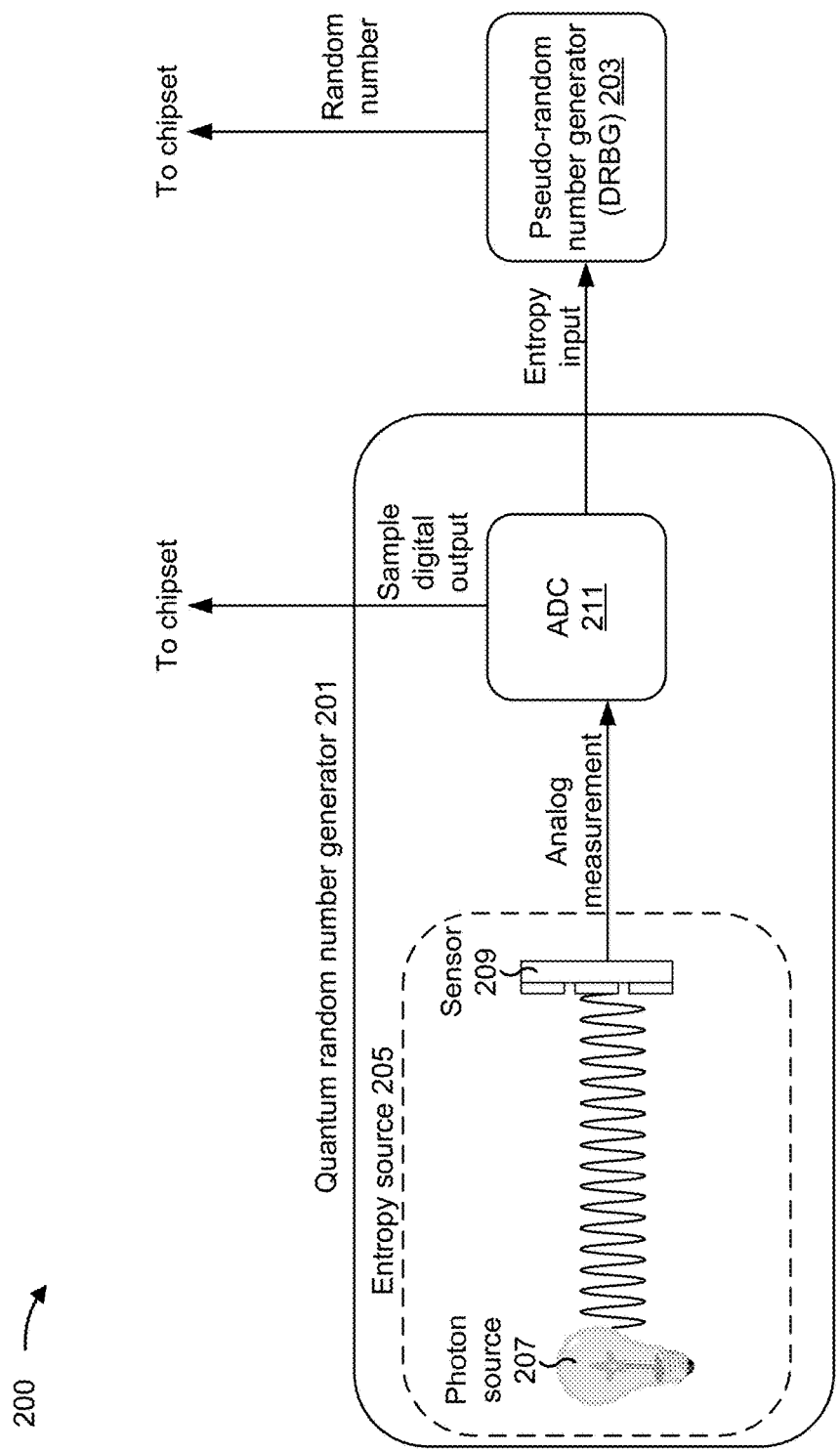
FIG. 2 is a diagram of an example quantum random number generator.

FIG. 2 is a diagram of an example 200 of a random number generation process with which systems and/or methods described herein may be implemented. As shown in FIG. 2, process 200 may use a quantum random number generator 201 (which may correspond to quantum random number generator 103) and a pseudo-random number generator 203. In some implementations, quantum random number generator 201 and/or pseudo-random number generator 203 may be included in user device 310 of FIG. 3. Devices used in process 200 may interconnect via wired connections, wireless connections, or a combination of wired and wireless connections.

As shown in FIG. 2, the quantum random number generator 201 may include an entropy source 205. In example 200, the entropy source 205 includes a photon source 207, such as a light emitting diode (LED), a laser, or another light source and a sensor 209, such as an active-pixel sensor (APS), a charge-coupled device (CCD), or another sensor that converts light from the LED 207 into an analog signal based on a measurement of at least one property of the light. Due to quantum uncertainty, some properties of the light generated by the photon source 207 (e.g., phase and/or intensity) are at least partially probabilistic. Accordingly, by using a measurement associated with a probabilistic property of the light, the analog signal generated by the sensor 209 may be characterized as having high entropy.

Although described above using photon source 207 and sensor 209, the quantum random number generator 201 may include additional or alternative entropy sources. For example, the quantum random number generator 201 may measure a voltage potential associated with the atmosphere. Due to quantum uncertainty, the voltage potential is at least partially probabilistic. In another example, the quantum random number generator 201 may extract noise from a microphone or a camera because such noise is probabilistic. Accordingly, the quantum random number generator 201 may use one or more devices to perform a measurement that is at least partially probabilistic in order to generate an analog signal with high entropy.

As further shown in FIG. 2, the analog signal based on the measurement is converted into a digital signal by an analog-to-digital converter (ADC) 211. Accordingly, the digital signal output by the ADC 211 may serve as an entropy input for pseudo-random number generator 203. In some implementations, the pseudo-random number generator 203 may be implemented by hardware (e.g., an application-specific integrated circuit (ASIC) and/or other specialized hardware configured to generate pseudo-random numbers) or a combination of hardware and software (e.g., an application executed on a microprocessor and/or other software implemented on generalized hardware). As shown in FIG. 2, the pseudo-random number generator 203 may use a DRBG algorithm. Using the pseudo-random number generator 203 ensures that the random number has a standardized length and is thus suitable for encryption, Monte Carlo initiation, or another use for which the random number is intended. As further shown in FIG. 2, the pseudo-random number generator 203 may output the random number to a chipset including or otherwise in communication with the quantum random number generator 201.

In some implementations, however, the entropy input from the entropy source 205 may be directly used as the random number in order to conserve processing resources and/or chip space. In order to use the entropy input directly, the quantum random number generator 201 may standardize the digital signal output from the ADC 211 in order to render the entropy input suitable for an intended use.

In some implementations, the digital signal output by the ADC 211 may additionally or alternatively serve as an indicator of a status of the quantum random number generator 201. Accordingly, the digital signal output by the ADC 211 may be a sample output, as shown in FIG. 2, requested (e.g., by the chipset including or otherwise in communication with the quantum random number generator 201) in order to detect a status of the quantum random number generator 201. In some implementations, a driver associated with the quantum random number generator 201 may use the digital signal to determine whether there is a malfunction. For example, damage to the sensor 209 may result in entropy inputs with entropy that does not satisfy a threshold.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
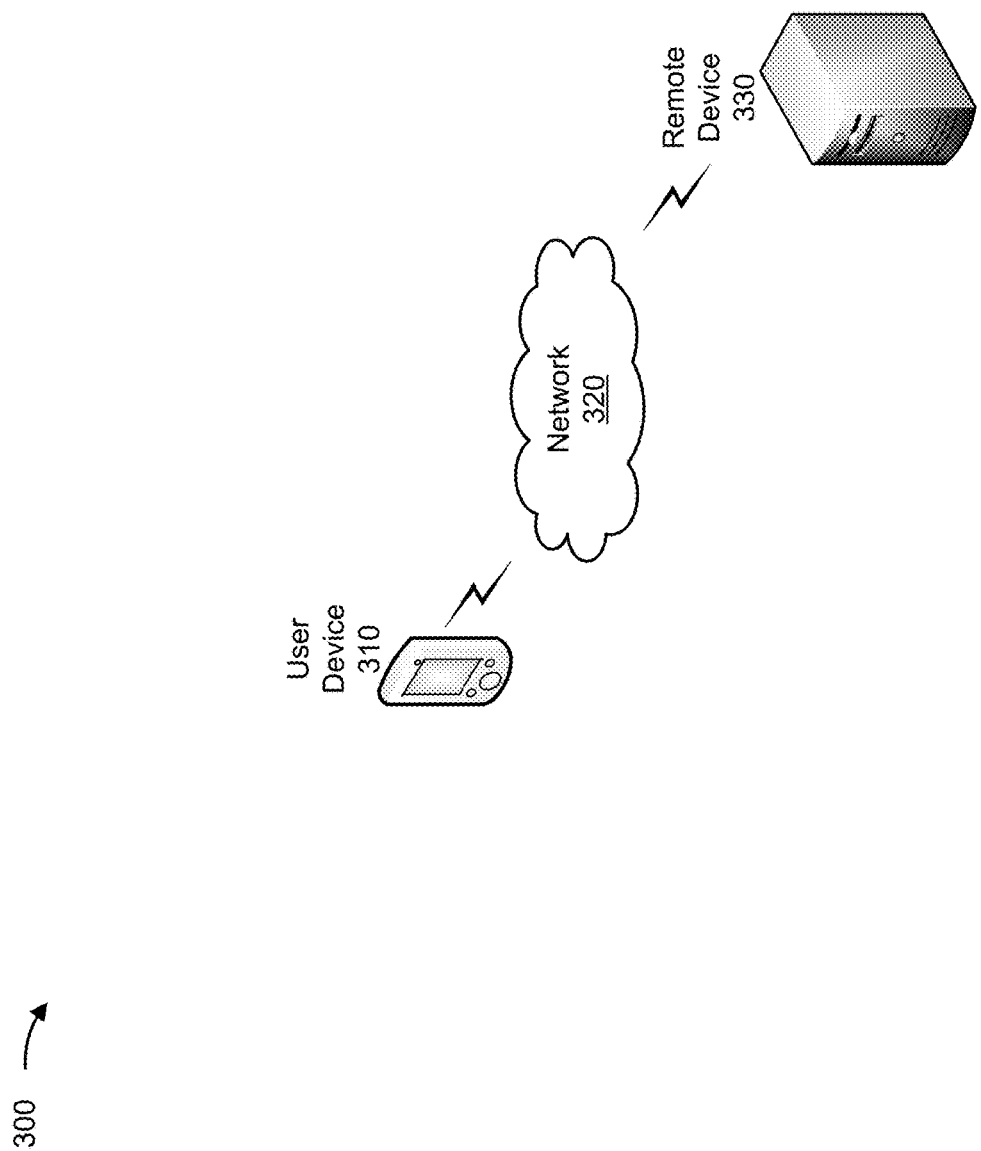
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a network 320, and a remote device 330. Devices of environment 300 may interconnect via wired connections, wireless connections, or a combination of wired and wireless connections.

The user device 310 includes one or more devices capable of receiving, generating, storing, processing, and/or providing information associated with secure random number generation, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 320 includes one or more wired and/or wireless networks. For example, the network 320 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, an ad hoc network, an intranet, the Internet, and/or a combination of these or other types of networks. In some implementations, the network 320 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a fiber optic-based network, and/or a combination of these or other types of networks. The network 320 enables communication among the devices of environment 300.

The remote device 330 includes one or more devices capable of receiving, generating, storing, processing, providing, and/or routing information associated with encryption based on secure random number generation, as described elsewhere herein. The remote device 330 may include a communication device and/or a computing device. For example, the remote device 330 may include a server, such as an application server, a client server, a web server, a database server, a host server, a proxy server, a virtual server (e.g., executing on computing hardware), or a server in a cloud computing system. In some implementations, the remote device 330 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
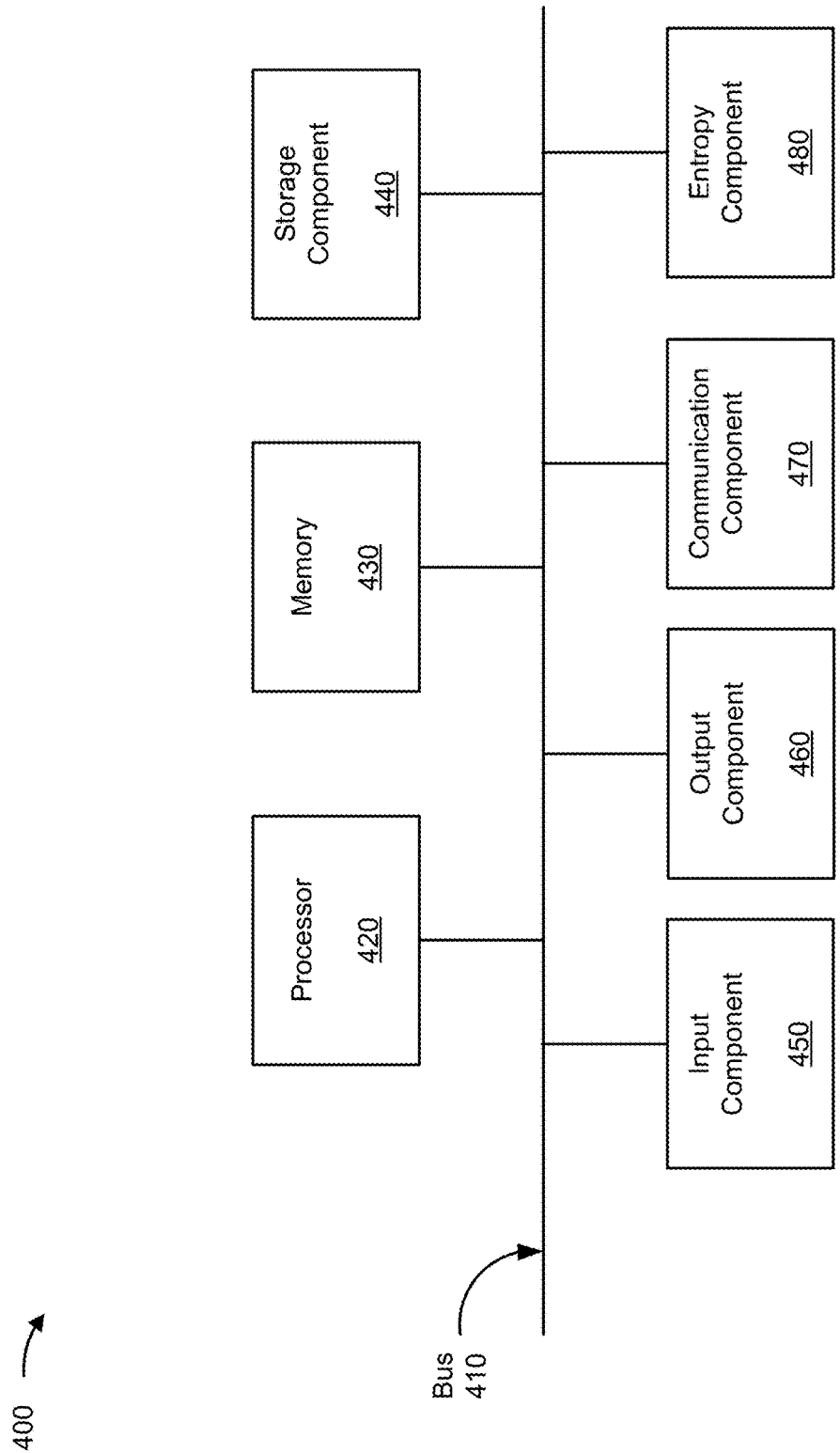
FIG. 4 is a diagram of example components of one or more devices of FIG. 3.

FIG. 4 is a diagram of example components of a device 400, which may correspond to user device 310 and/or remote device 330. In some implementations, user device 310 and/or remote device 330 may include one or more devices 400 and/or one or more components of device 400. As shown in FIG. 4, device 400 may include a bus 410, a processor 420, a memory 430, a storage component 440, an input component 450, an output component 460, a communication component 470, and an entropy component 480.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Entropy component 480 generates an entropy input with high entropy. For example, entropy component 480 may include a quantum random number generator (e.g., as described in connection with FIG. 2).

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
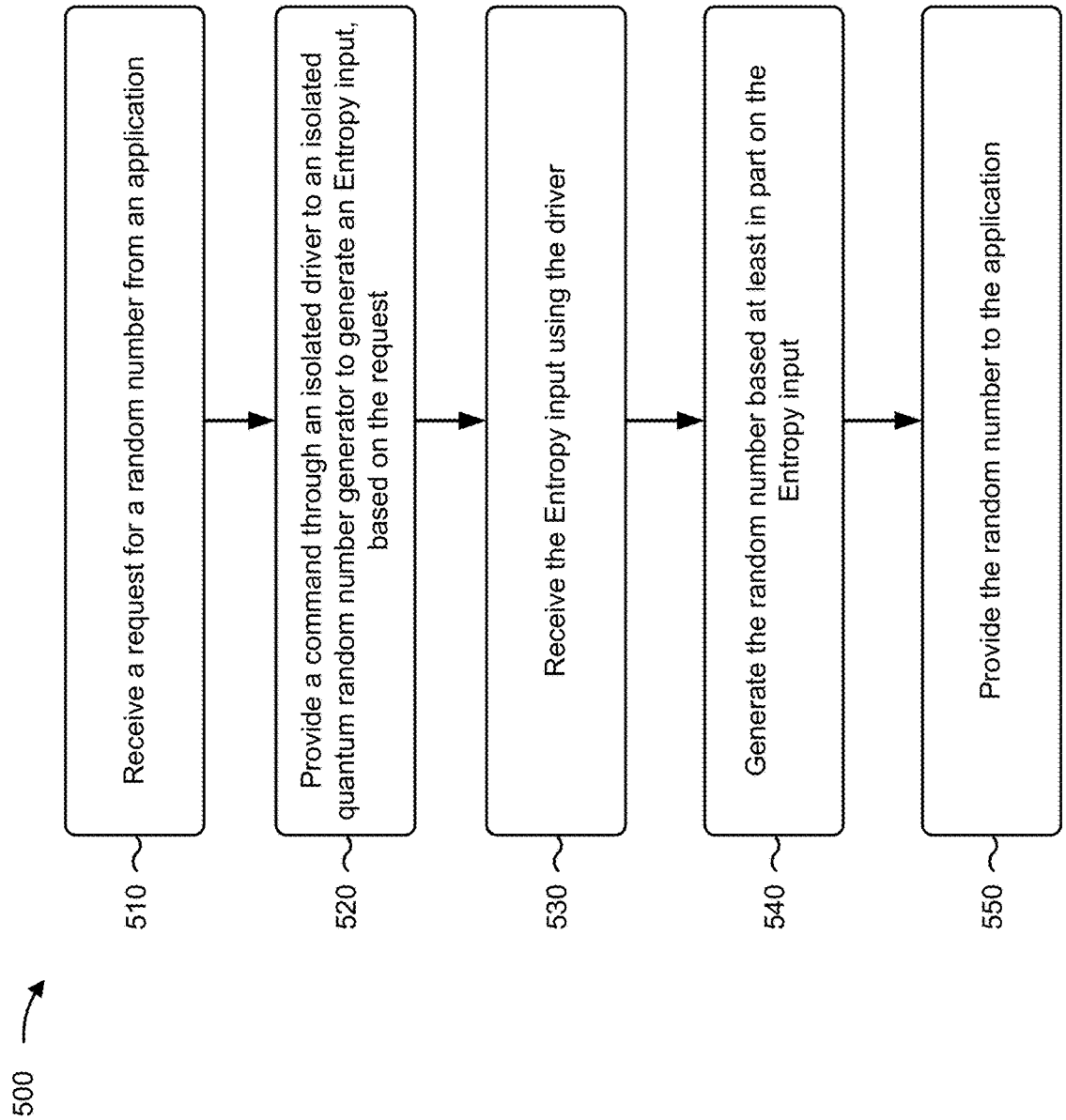
FIG. 5 is a flowchart of an example process relating to secure random number generation.

FIG. 5 is a flowchart of an example process 500 associated with secure random number generation. In some implementations, one or more process blocks of FIG. 5 may be performed by a user device (e.g., user device 310). Additionally, or alternatively, one or more process blocks of FIG. 5 may be performed by one or more components of device 400, such as processor 420, memory 430, storage component 440, input component 450, output component 460, communication component 470, and/or entropy component 480.

As shown in FIG. 5, process 500 may include receiving, at an operating system, a request for a random number from an application (block 510). For example, the user device may receive, at an operating system, a request for a random number from an application, as described herein.

As further shown in FIG. 5, process 500 may include providing a command through a driver that is isolated from the operating system to a quantum random number generator to generate an entropy input, based on the request (block 520). For example, the user device may provide a command to generate an entropy input, based on the request for the random number and through a driver that is isolated from the operating system, to a quantum random number generator, as described herein. The quantum random number generator may be isolated from one or more processors hosting the operating system (e.g., as described in connection with FIGS. 1A-1H).

In some implementations, the operating system is an HLOS. Accordingly, providing the command may include providing the request to a secure operating system that is isolated from the HLOS. Additionally, the driver may be implemented on a kernel of the secure operating system such that the command is provided to the quantum random number generator, through the driver, from the secure operating system. As an alternative, the operating system is a secure operating system, the driver is implemented on a kernel of the secure operating system, and the command is provided to the quantum random number generator, through the driver, from the secure operating system.

In some implementations, providing the command to the driver includes providing the command to a Secure Element. The Secure Element may be isolated from the one or more processors hosting the operating system, and the driver may be implemented on the Secure Element.

As further shown in FIG. 5, process 500 may include receiving the entropy input, from the quantum random number generator, using the driver (block 530). For example, the user device may receive the entropy input, from the quantum random number generator, using the driver, as described herein.

As further shown in FIG. 5, process 500 may include generating the random number based at least in part on the entropy input (block 540). For example, the user device may generate the random number based at least in part on the entropy input, as described herein. In some implementations, generating the random number may include inputting the entropy input to a pseudo-random number generator that executes within an environment of the secure operating system, and receiving the random number from the pseudo-random number generator. As an alternative, generating the random number may include inputting the entropy input to a pseudo-random number generator that executes within an environment of the Secure Element, and receiving the random number from the Secure Element.

As further shown in FIG. 5, process 500 may include providing the random number to the application (block 550). For example, the user device may provide the random number to the application, as described herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at an operating system, a request for a random number from a first application executing within a user space of an unsecure environment provided by the operating system;
   providing the request through a first driver that is provisioned by a secure operating system to a second application that is implemented in a user space of a secure environment;
   providing the request to a second driver executed by a kernel of the secure environment;
   providing, by the second driver, a command to a quantum random number generator that is isolated from one or more processors hosting the operating system to generate an entropy input, based on the request for the random number;
   receiving the entropy input from the quantum random number generator;
   generating the random number based at least in part on the entropy input; and
   providing the random number to the first application.

2. The method of claim 1, wherein the operating system comprises a high-level operating system, and
   wherein the first driver does not have access to a kernel space of the secure environment.

3. The method of claim 2, wherein generating the random number comprises:
   inputting the entropy input to a pseudo-random number generator that executes within an environment of the secure operating system; and
   receiving the random number from the pseudo-random number generator.

4. The method of claim 1, wherein the secure operating system is associated with a trusted operating system, and
   wherein the trusted operating system is logically distinct from the kernel of the secure operating system.

5. The method of claim 1, wherein providing the request to the second driver comprises:
   providing the request to a Secure Element that is isolated from the one or more processors hosting the operating system,
   wherein the second driver is implemented on the Secure Element.

6. The method of claim 5, wherein generating the random number comprises:
   inputting the entropy input to a pseudo-random number generator that executes within an environment of the Secure Element; and
   receiving the random number from the Secure Element.

7. A device, comprising:
   one or more processors configured to:
   provide a request for a random number, from a high-level operating system, to a first driver that is provisioned by a secure operating system that is isolated from the high-level operating system;
   provide the request to an application that is implemented in a user space of a secure environment;
   provide the request to a second driver implemented on a kernel of the secure environment;
   provide a command to generate an entropy input, to a quantum random number generator that is isolated from the one or more processors, through the second driver implemented on the kernel of the secure operating system;
   receive, at the secure operating system and using the second driver, the entropy input from the quantum random number generator; and
   generate the random number based at least in part on the entropy input.

8. The device of claim 7, wherein the one or more processors are configured to virtually isolate the secure environment from an environment of the high-level operating system.

9. The device of claim 7, wherein the one or more processors comprise a first processor hosting an environment of the secure operating system and a second processor hosting an environment of the high-level operating system, wherein the first processor and the second processor are physically isolated.

10. The device of claim 7, wherein the one or more processors are further configured to:
provide the random number to an application associated with the request.

11. The device of claim 10, wherein the one or more processors, to provide the random number to the application associated with the request, are configured to:
receive the random number, at a kernel of the high-level operating system and using the first driver, from the application implemented in the user space of the secure environment; and
provide the random number to the application associated with the request from the kernel of the high-level operating system.

12. The device of claim 7, wherein the one or more processors, to generate the random number, are configured to:
input the entropy input to a pseudo-random number generator that executes within an environment of the secure operating system; and
receive the random number from the pseudo-random number generator.

13. The device of claim 7, wherein the one or more processors, to provide the request to the secure operating system, are configured to:
receive the request, at a kernel of the high-level operating system, from an application executing within an environment of the high-level operating system; and
provide the request to the application implemented in the user space of the secure environment using the first driver that is provisioned by the secure operating system.

14. The device of claim 7, wherein the one or more processors, to provide the command to the quantum random number generator, are configured to:
receive the request from a trusted operating system from the application; and
provide the command to the quantum random number generator using the second driver.

15. A device, comprising:
a Secure Element implementing a first driver that communicates with a quantum random number generator that is isolated from the Secure Element; and
one or more processors, isolated from the Secure Element, configured to:
receive, at an operating system, a request for a random number from a first application;
provide, from the operating system and to a second application in a secure environment associated with the Secure Element, the request for the random number, through a second driver implemented on a kernel that is provisioned by a secure operating system associated with the secure environment;
provide, from the second application and to the first driver, the request for the random number; and
receive, at the operating system and using the second driver implemented on the kernel, the random number based at least in part on an entropy input from the quantum random number generator.

16. The device of claim 15, wherein the one or more processors, to receive the random number, are configured to:
receive the random number based on a pseudo-random number generator that executes within an environment of the Secure Element.

17. The device of claim 15, wherein the one or more processors are further configured to:
generate a command, based on the request, at the kernel of the operating system; and
provide the command to the quantum random number generator using the second driver.

18. The device of claim 15, wherein the operating system is a high-level operating system.

19. The device of claim 15, wherein the operating system is a secure operating system.

20. The device of claim 15, wherein the one or more processors are further configured to:
provide the random number to an application associated with the request.

* * * * *